(12) United States Patent
Ozawa

(10) Patent No.: US 8,634,147 B2
(45) Date of Patent: Jan. 21, 2014

(54) APPARATUS FOR TRANSFERRING OPTICAL ELEMENT

(75) Inventor: Hidemasa Ozawa, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 229 days.

(21) Appl. No.: 13/155,487

(22) Filed: Jun. 8, 2011

(65) Prior Publication Data

US 2012/0134032 A1    May 31, 2012

(30) Foreign Application Priority Data

Nov. 30, 2010   (KR) .................. 10-2010-0120613

(51) Int. Cl.
*G02B 7/02*    (2006.01)

(52) U.S. Cl.
USPC ......................................................... 359/811

(58) Field of Classification Search
USPC ................................................. 359/811–830
See application file for complete search history.

(56) References Cited

U.S. PATENT DOCUMENTS 5,166,829 A * 11/1992 Iizuka ........................... 359/699
2002/0039242 A1* 4/2002 Sasaki et al. .................. 359/819

FOREIGN PATENT DOCUMENTS

JP           02-253210 A    10/1990

\* cited by examiner

*Primary Examiner* — Thomas K Pham
*Assistant Examiner* — Vipin Patel
(74) *Attorney, Agent, or Firm* — Drinker Biddle & Reath LLP

(57) ABSTRACT

An apparatus that transfers an optical element includes: a driving unit that generates a driving force in response to an external signal, a rotating plate that rotates due to the driving unit, a first deceleration unit that is rotatably in frictional contact with the rotating plate, a rotating shaft that has an outer screw surface and that rotates by being mated to the first deceleration unit, an intermediate plate that is rotatably in frictional contact with the first deceleration unit, a second deceleration unit that is rotatably in frictional contact with the intermediate plate, a transmission unit that transmits an external rotational force to the second deceleration unit, and a moving unit that supports the optical element and that is engaged with the outer screw surface of the rotating shaft and moves with the rotating shaft as the rotating shaft rotates.

5 Claims, 7 Drawing Sheets

APPARATUS FOR TRANSFERRING OPTICAL ELEMENT

CROSS-REFERENCE TO RELATED PATENT APPLICATION

This application claims the priority benefit of Korean Patent Application No. 10-2010-0120613, filed on Nov. 30, 2010, in the Korean Intellectual Property Office, the entire disclosure of which is incorporated herein by reference.

BACKGROUND

1. Field of the Invention

Embodiments relate to an apparatus for transferring an optical element, and more particularly, to an apparatus for transferring an optical element such as a lens that may perform both an automatic adjustment function of automatically moving the optical element and a manual adjustment function based on a user's manipulation.

2. Description of the Related Art

Digital photographing apparatuses, such as cameras or camcorders, perform a focusing or zooming function by moving an optical element such as a lens. In general, examples of a focusing function include an auto-focusing (AF) function and a manual focusing function (MF). The AF function adjusts a focus by automatically moving a lens without a user's manipulation, and the MF function adjusts a focus by manually moving a lens while a user sees an image with his/her eyes.

While the AF function allows easy photographing, it is difficult to finely adjust a position of a lens by using the AF function, unlike the MF function.

As digital photographing apparatuses are widely used, users want to freely adjust a position of a lens at any time even while an AF mode or the AF function is being implemented. To this end, in the related art, a technology in which a user may select the AF function or the MF function by using an additional switch has been used. However, it is cumbersome to switch between functions.

In order to perform an MF function while an AF function is being performed, mechanical elements having large volumes and complex structures and designed to transmit or cut off a driving force of a driving unit for performing the AF function should be employed.

SUMMARY

Embodiments provide an apparatus for transferring an optical element such as a lens that may not only automatically adjust a position of the optical element but also may allow a user to manually finely adjust the position of the optical element according to his/her need. That is, embodiments provide the apparatus for transferring the optical element that may perform both an automatic adjustment function of automatically moving the optical element and a manual adjustment function based on the user's manipulation, without using an additional switch.

Embodiments also provide an apparatus for transferring an optical element that may perform both an automatic adjustment function and a manual adjustment function to adjust a position of the optical element and may be designed to have a simple and compact structure.

According to an embodiment, there is provided an apparatus that transfers an optical element. The apparatus includes: a driving unit that generates a driving force in response to an external signal, a rotating plate that rotates due to the driving unit, a first deceleration unit that is rotatably in frictional contact with the rotating plate, a rotating shaft that has an outer screw surface and that rotates by being mated to the first deceleration unit, an intermediate plate that is rotatably in frictional contact with the first deceleration unit, a second deceleration unit that is rotatably in frictional contact with the intermediate plate, a transmission unit that transmits an external rotational force to the second deceleration unit, and a moving unit that supports the optical element and that is engaged with the outer screw surface of the rotating shaft and moves with the rotating shaft as the rotating shaft rotates.

The first deceleration unit may include first deceleration balls that contact the rotating plate and a first deceleration plate that rotatably supports the first deceleration balls and is rotatable with respect to the rotating plate.

The rotating plate may include a rotation central shaft that protrudes toward the first deceleration plate, and the first deceleration plate may be rotatably mated to the rotation central shaft. The first deceleration balls may be mated to the first deceleration plate to be spaced apart from one another around the rotation central shaft.

The apparatus may include support balls that are at positions inward of the first deceleration balls between the first deceleration plate and the rotating plate and that rotatably support the first deceleration plate with respect to the rotating plate.

The intermediate plate may frictionally contact the first deceleration balls and may be rotatable with respect to the first deceleration plate.

The second deceleration unit may include second deceleration balls that contact the intermediate plate, and a second deceleration plate that rotatably supports the second deceleration balls and that is rotatable with respect to the rotating plate.

The apparatus may further include: a pressure plate that frictionally contacts the second deceleration balls, an elastic pressure portion that has a first end applying pressure on the pressure plate, and a cover that supports a second end of the elastic pressure portion.

The apparatus may further include a rotatable ring that is rotatable relative to the transmission unit and has a driving gear, wherein a driven gear is on an outer surface of the second deceleration plate, and wherein the transmission unit has a first transmission gear engaged with the driving gear and a second transmission gear engaged with the driven gear and rotatably placed outside the second deceleration plate.

In order for the intermediate plate to be maintained in a stopped state while the rotating plate rotates due to the driving unit, a driving force of the driving unit transmitted through the first deceleration unit to the intermediate plate may be set to be smaller than a force necessary for rotating the transmission unit.

When the driving unit does not generate the driving force, the rotating shaft may be in a state where the rotating shaft is rotatable due to an external force, and when the external rotational force is transmitted through the transmission unit to the second deceleration unit, the intermediate plate, the first deceleration unit, and the rotating plate may rotate together due to the second deceleration unit.

BRIEF DESCRIPTION OF THE DRAWINGS

The above and other features and advantages will become more apparent by describing in detail exemplary embodiments with reference to the attached drawings in which.

DETAILED DESCRIPTION

Embodiments will now be described more fully with reference to the accompanying drawings, in which exemplary embodiments are shown.

Figure 1:
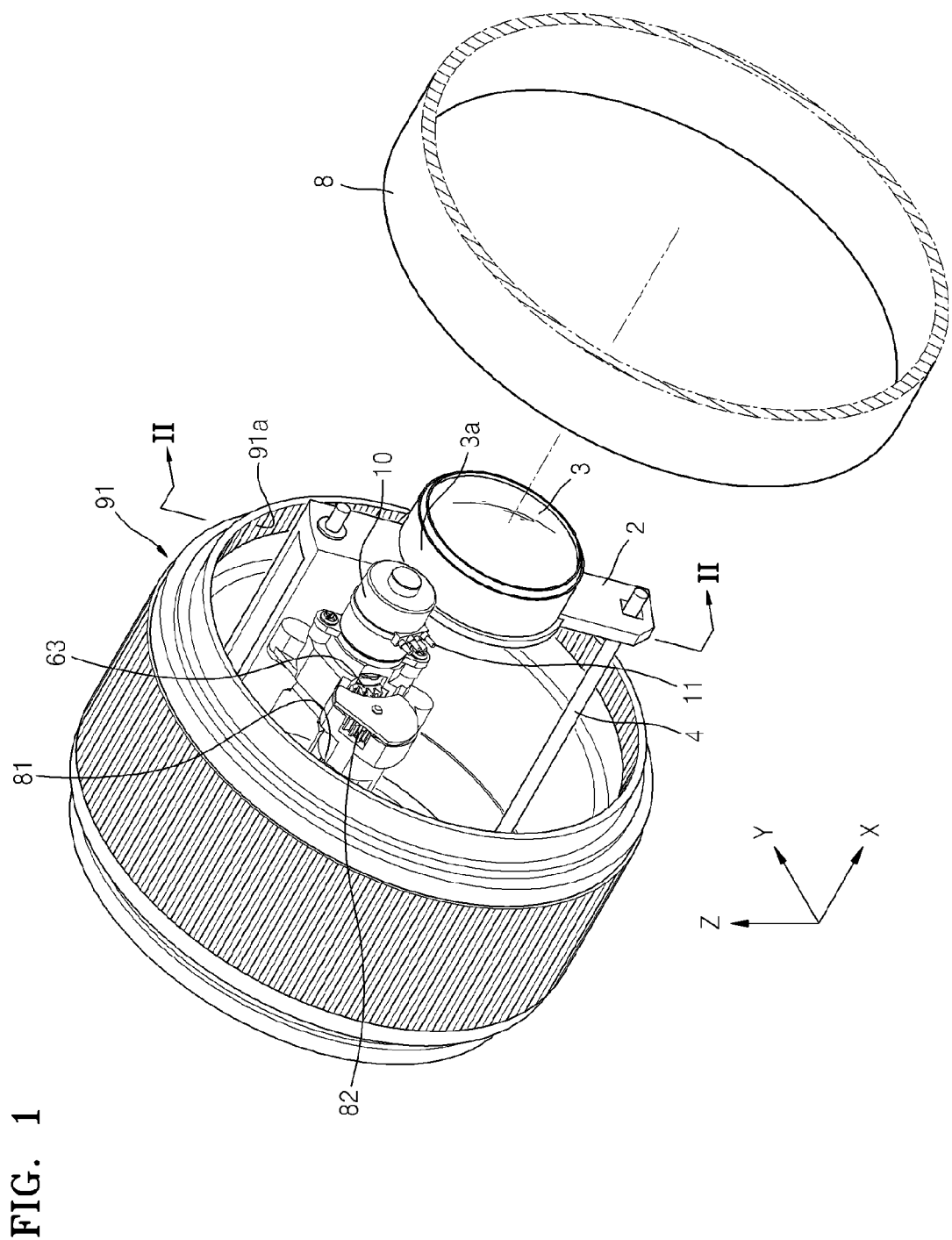
FIG. 1 is a perspective view of an apparatus for transferring an optical element, according to an embodiment.
Figure 2:
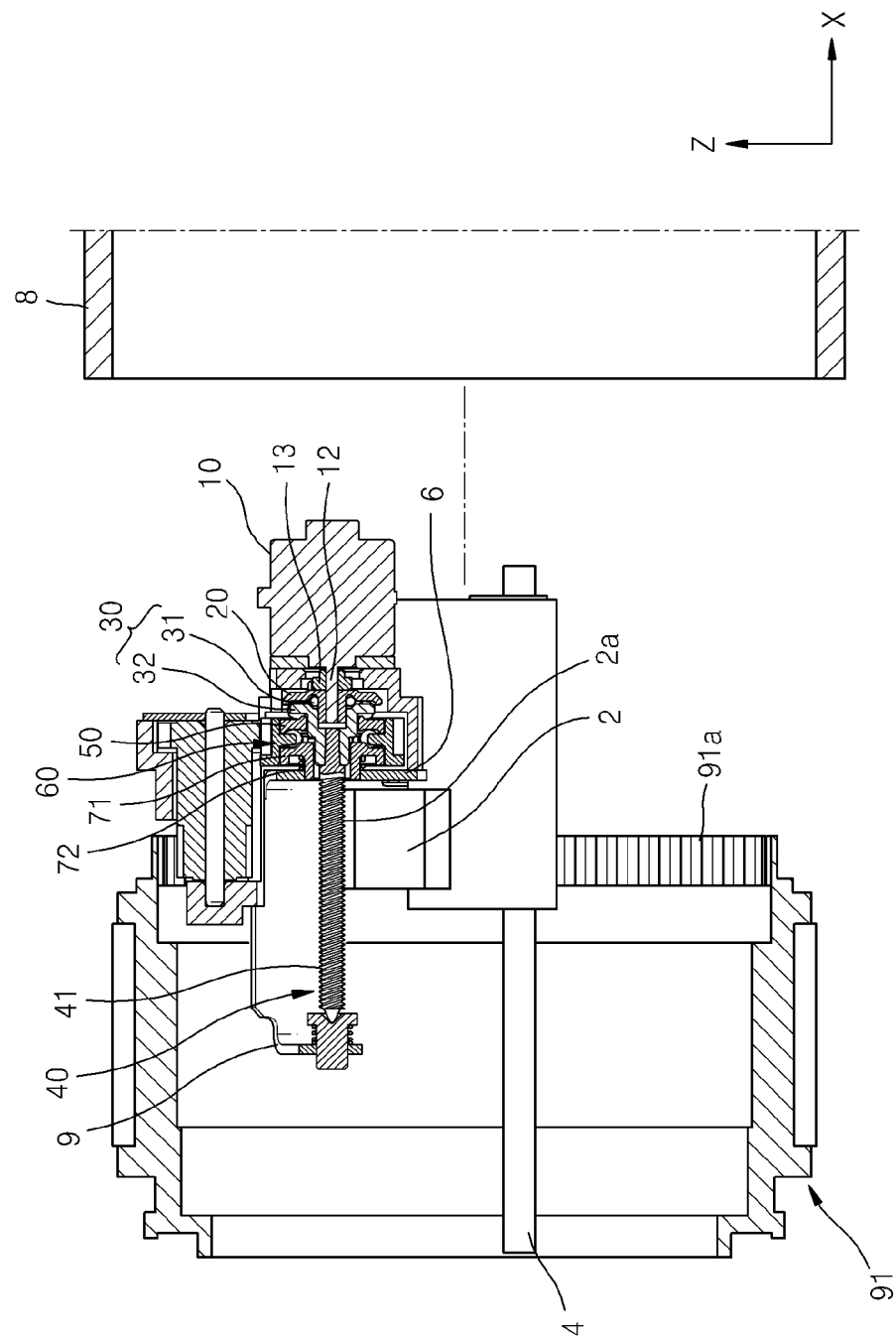
FIG. 2 is a cross-sectional view of the apparatus of FIG. 1.
Figure 3:
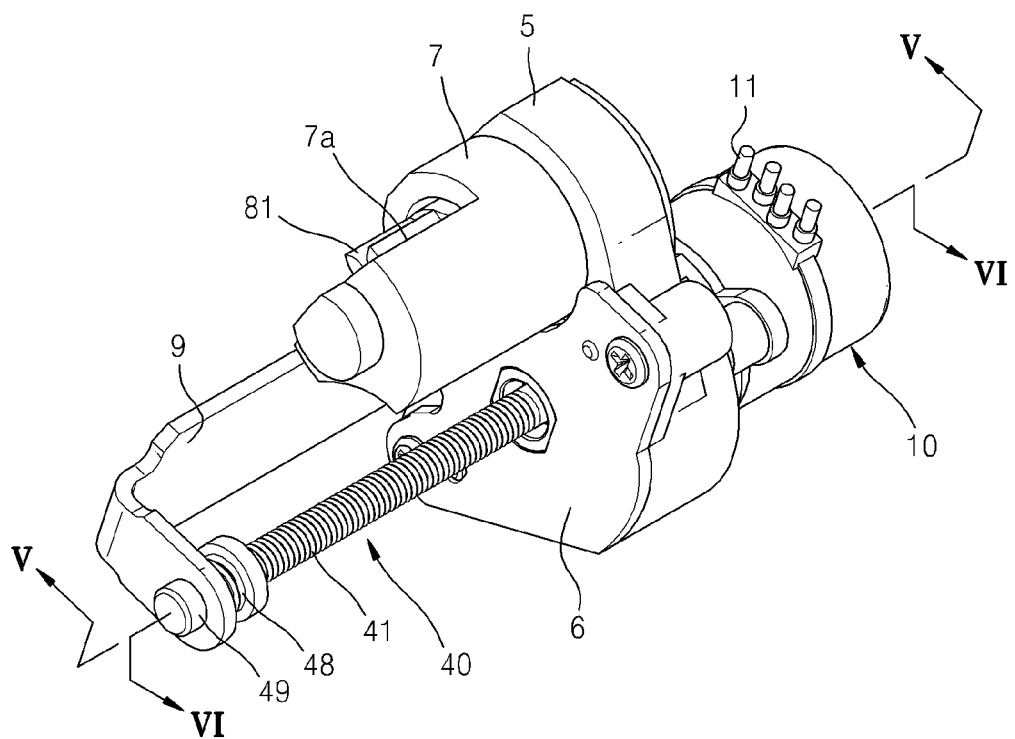
FIG. 3 is a perspective view illustrating some elements of the apparatus of FIG. 1.
Figure 4:
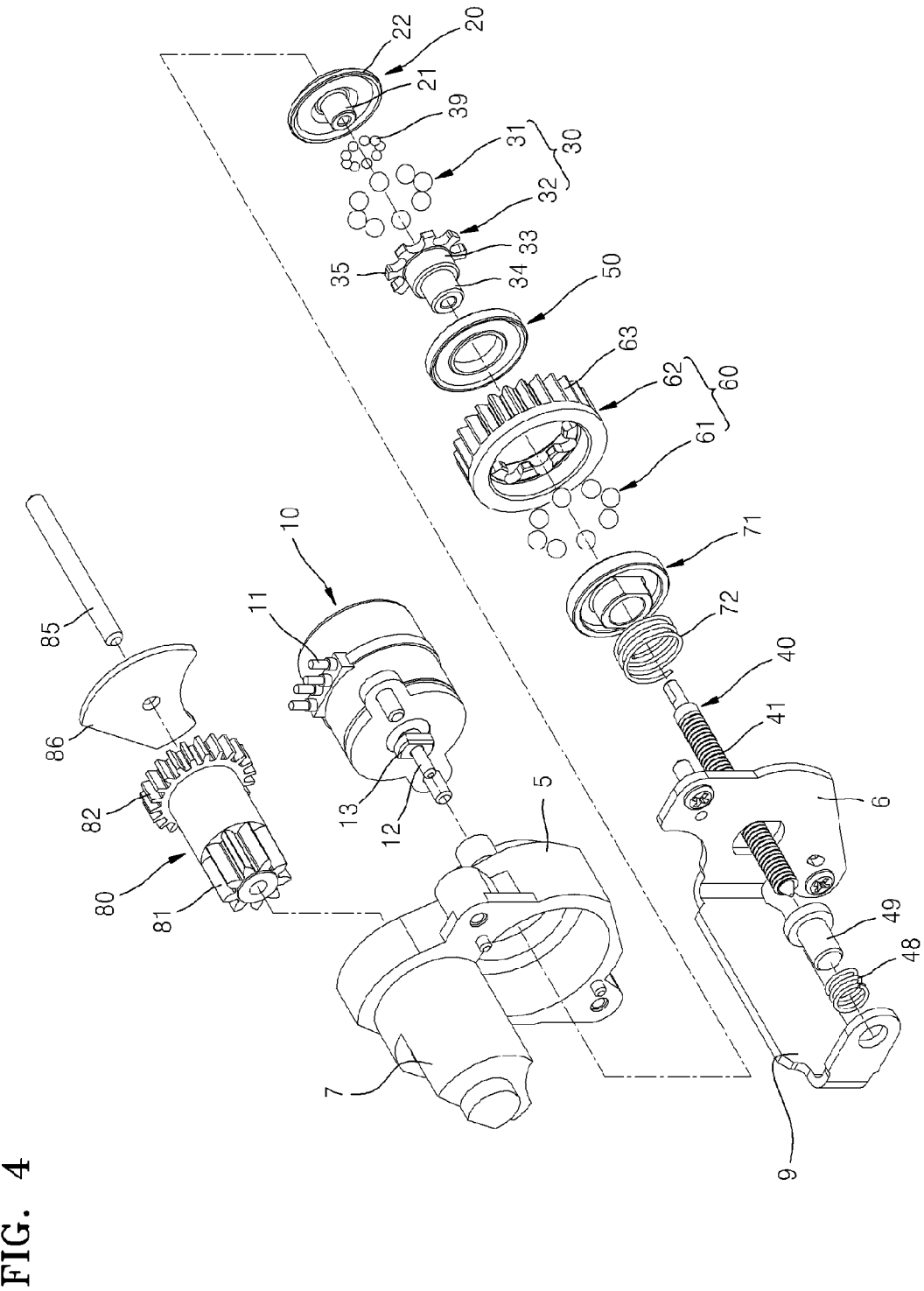
FIG. 4 is an exploded perspective view illustrating some elements of the apparatus of FIG. 1.

FIG. 1 is a perspective view of an apparatus for transferring an optical element 3 according to an embodiment. FIG. 2 is a cross-sectional view of the apparatus of FIG. 1. FIG. 3 is a perspective view illustrating some elements of the apparatus of FIG. 1. FIG. 4 is an exploded perspective view illustrating some elements of the apparatus of FIG. 1.

Referring to FIGS. 1 and 2, the apparatus can include a driving unit 10 that can generate a driving force, a rotating plate 20 that can be rotated by the driving unit 10, a first deceleration unit 30 that can rotate in frictional contact with the rotating plate 20, a rotating shaft 40 that can rotate by being connected to the first deceleration unit 30, an intermediate plate 50 that can rotate in frictional contact with the first deceleration unit 30, a second deceleration unit 60 that can rotate in frictional contact with the intermediate plate 50, a transmission unit 80 (shown in FIG. 4) that can transmit an external rotational force to the second deceleration unit 60, and a moving unit 2 that can support the optical element 3 and that can move along the rotating shaft 40.

The moving unit 2 can be connected to a frame 3a that can support the optical element 3. The moving unit 2 can be slidably disposed on a guide 4 that can extend in a direction substantially parallel to an optical axis direction. Referring to FIG. 2, the moving unit 2 can include a screw portion 2a that can correspond to a screw surface 41 of the rotating shaft 40. Since the moving unit 2 can be screw-coupled to the rotating shaft 40, as the rotating shaft 40 rotates, the moving unit 2 can move with the rotating shaft 40.

FIG. 3 is a perspective view illustrating some elements of the apparatus of FIG. 1. FIG. 4 is an exploded perspective view illustrating some elements of the apparatus of FIG. 1.

The driving unit 10, which can generate a driving force for moving the optical element 3, may be a step motor or any of other various units that can generate a rotational force. The driving unit 10 can be installed behind a case 5. An input cable 11 that can transmit an external control signal can be connected to the driving unit 10. The driving unit 10 may be controlled by a control unit (not shown) that can automatically adjust a focus by adjusting a position of the optical element 3.

The driving unit 10 can include an output shaft 12 that can be rotatable. The rotating plate 20 can be coupled by a shaft connection unit 13 to the output shaft 12. The rotating plate 20 can include a shaft coupling portion 24 (see FIG. 6) into which the shaft connection unit 13 can be inserted. As the driving unit 10 operates and the output shaft 12 rotates, the rotating plate 20 can rotate at the same speed as the output shaft 12.

When the rotating plate 20 rotates due to the driving unit 10, the rotating plate 20 can transmit a driving force that can be generated by the driving unit 10 to another element. The rotating plate 20 can include a rotation central shaft 21 and a friction plate 22. The rotation central shaft 21 can protrude away from the driving unit 10, that is, toward the first deceleration unit 30. The friction plate 22 can extend outwardly from the rotation central shaft 21. The rotating plate 20 can be disposed inside the case 5 to be connected to the driving unit 10.

Figure 5:
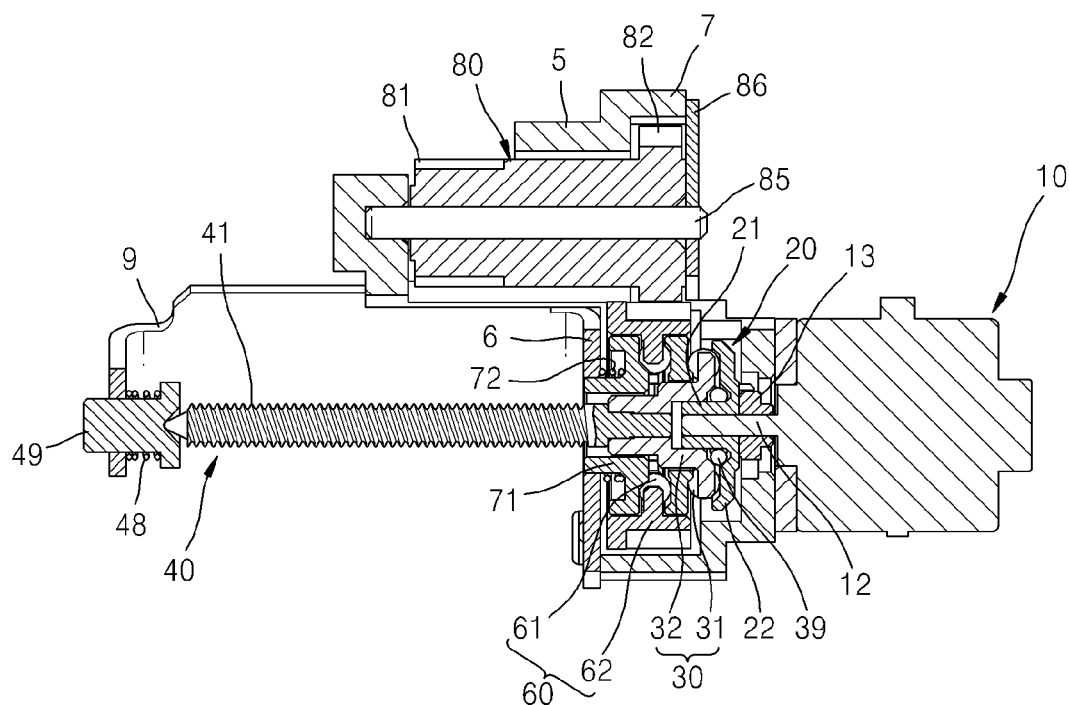
FIG. 5 is a cross-sectional view taken along a line V-V of FIG. 3.
Figure 6:
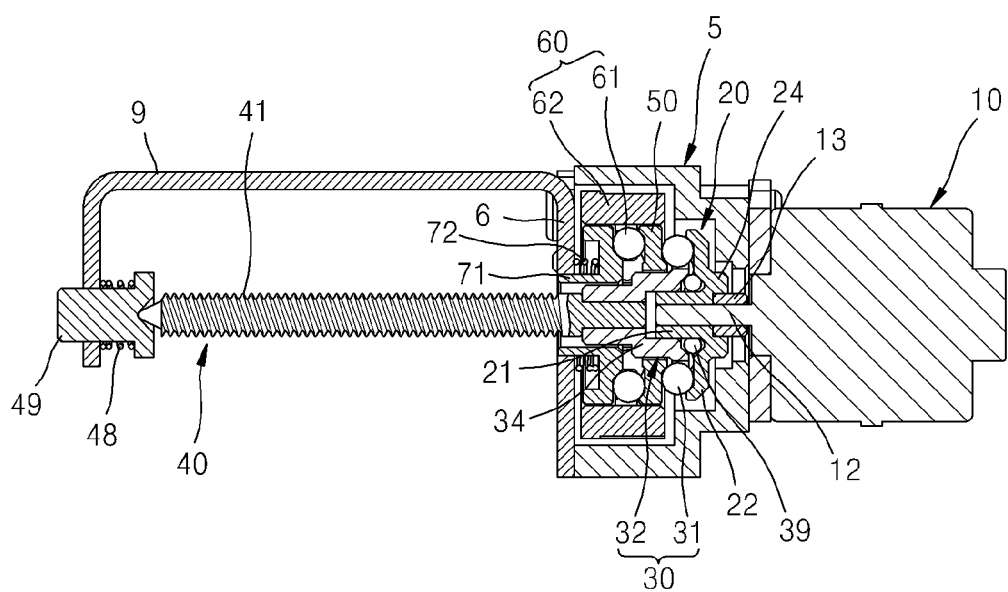
FIG. 6 is a cross-sectional view taken along a line VI-VI of FIG. 3.

FIG. 5 is a cross-sectional view taken along a line V-V of FIG. 3. FIG. 6 is a cross-sectional view taken along a line VI-VI of FIG. 3.

The first deceleration unit 30 can be disposed in front of the rotating plate 20 to rotate in frictional contact with the rotating plate 20. The first deceleration unit 30 can lower a rotational force transmitted by the rotating plate 20 and can transmit the lowered rotational force. The first deceleration unit 30 can include first deceleration balls 31 and a first deceleration plate 32. The first deceleration balls 31 can contact the friction plate 22 of the rotating plate 20. The first deceleration plate 32 can rotatably support the first deceleration balls 31. The first deceleration plate 32 can also be rotatably disposed on the rotating plate 20.

Referring to FIG. 4, the first deceleration plate 32 can include a cylindrical portion 33, a ball support portion 35, and a support shaft 34. The cylindrical portion 33 can be rotatably coupled to an outer circumferential surface of the rotation central shaft 21 of the rotating plate 20. The ball support portion 35 can protrude outwardly from the cylindrical portion 32. The support shaft 34 can protrude forwardly from the cylindrical portion 33.

Since the support shaft 34 can be coupled to the rotating shaft 40, once the first deceleration unit 30 rotates, the rotating shaft 40 may rotate at the same speed as the first deceleration unit 30. An outer circumferential surface of the support shaft 34 can be rotatably supported by a pressure plate 71.

Since the plurality of first deceleration balls 31 can be coupled to the ball support portion 35 of the first deceleration plate 32, the first deceleration balls 31 can be coupled to the first deceleration plate 32 to be spaced apart from one another around the rotation central shaft 21. Support balls 39 can be disposed between the first deceleration plate 32 and the rotating plate 20. The support balls 39 can be disposed at positions inward of the first deceleration balls 31 and can rotatably support the first deceleration plate 32 with respect to the rotating plate 20.

The intermediate plate 50 can be rotatably disposed in frictional contact with the first deceleration unit 30. The intermediate plate 50 can transmit a rotational force transmitted by the first deceleration unit 30 to the second deceleration unit 60. The intermediate plate 50 can be rotatably coupled to an outer circumferential surface of the cylindrical portion 33 of the first deceleration plate 32 so as to be in frictional contact with the first deceleration balls 31.

The second deceleration unit 60, which can be rotatable in frictional contact with the intermediate plate 50, can be disposed in front of the intermediate plate 50. The second deceleration unit 60 can include second deceleration balls 61 and a second deceleration plate 62. The second deceleration balls 61 can contact the intermediate plate 50. The second deceleration plate 62 can rotatably support the second deceleration balls 61 and can be rotatable with respect to rotating plate 20.

The pressure plate 71 can be disposed to be in frictional contact with the second deceleration balls 61, an elastic pressure portion 72, and a cover 6. The elastic pressure portion 72 can have a first end pushing the pressure plate 71 toward the second deceleration unit 60. The cover 6 can support a second end of the elastic pressure portion 72. The pressure plate 71, the elastic pressure portion 72, and the cover 6 can be disposed in front of the second deceleration unit 60.

Although the elastic pressure portion 72 is a compression coil spring in FIG. 4, embodiments are not limited thereto, and the elastic pressure portion 72 may be any type of elastic member such as a leaf spring or an elastic rubber plate.

After the rotating plate 20, the first deceleration unit 30, the intermediate plate 50, the second deceleration unit 60, the pressure plate 71, and the elastic pressure portion 72 are received in the case 5, the cover 6 can cover the case 5. Also, the cover 6 can apply pressure on the elastic pressure portion 72 so that a pressure is applied between elements between the pressure plate 71 to the rotating plate 20.

Due to the cover 6, the elastic pressure portion 72, and the pressure plate 71, a predetermined force may be maintained on a first contact surface between the intermediate plate 50 and the pressure plate 71 that can contact the second deceleration balls 61, and a second contact surface between the rotating plate 20 and the intermediate plate 50 that can contact the first deceleration balls 31. Accordingly, once the rotating plate 20 rotates, a frictional force can be applied between the rotating plate 20 and the first deceleration balls 31, and thus a rotational force may be transmitted to the intermediate plate 50. Also, if an external force is applied to rotate the second deceleration unit 60, a frictional force can be applied between the second deceleration balls 61 and the intermediate plate 50, and thus a rotational force may be transmitted to the first deceleration unit 30 and the rotating plate 20.

A shaft support portion 9 extending in a direction in which the rotating shaft 40 extends and for supporting an end portion of the rotating shaft 40 can be formed on the cover 6. A support head 49 for contacting the end portion of the rotating shaft 40 and a spring 48 for elastically pushing against the support head 49 can be disposed on an end portion of the shaft support portion 9.

Figure 7:
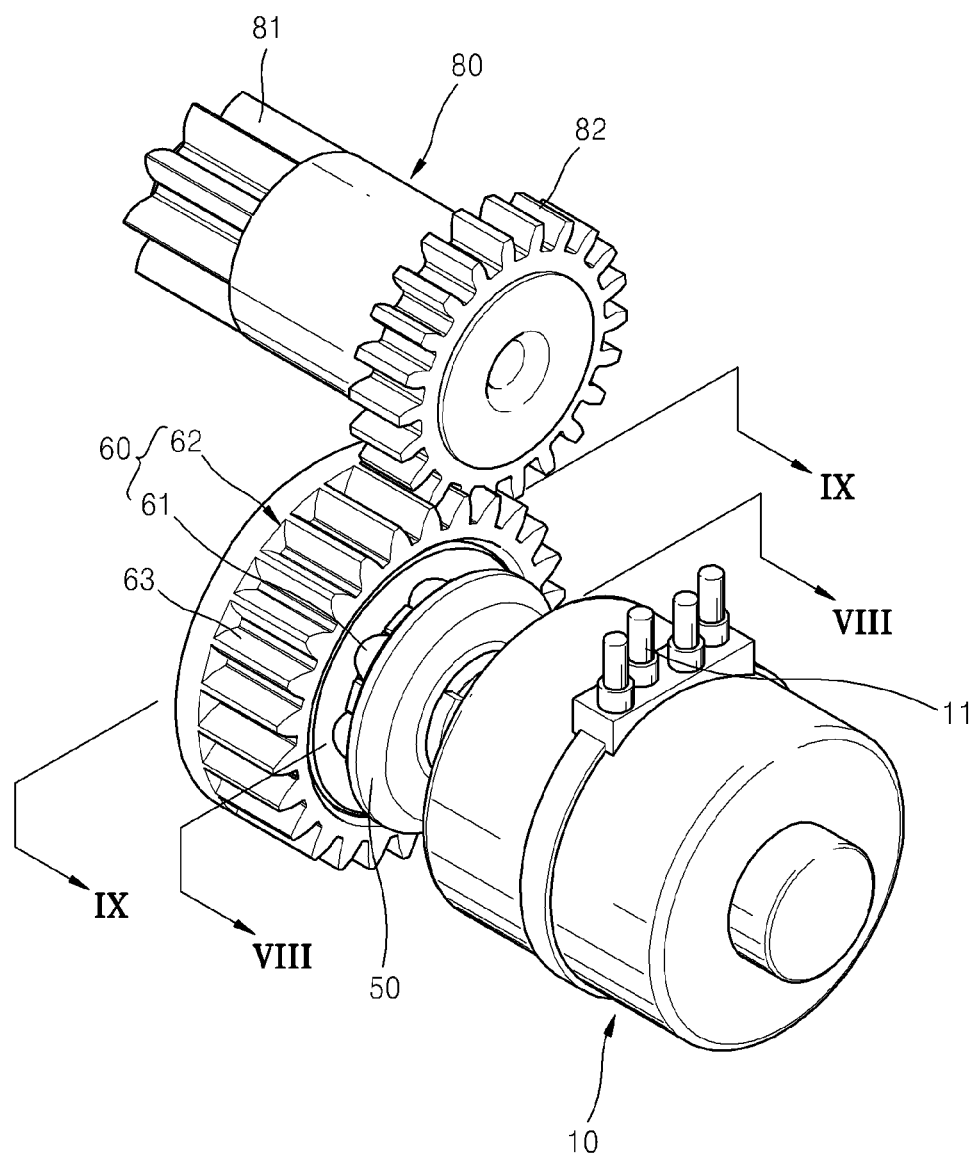
FIG. 7 is a perspective view illustrating some elements of the apparatus of FIG. 1.
Figure 8:
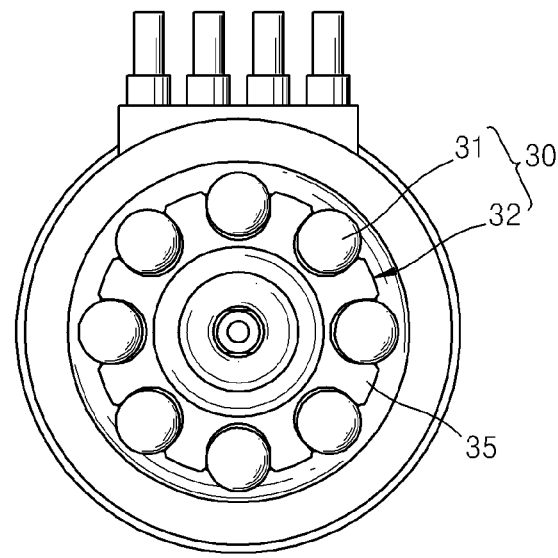
FIG. 8 is a partial cross-sectional view taken along a line VIII-VIII of FIG. 7.
Figure 9:
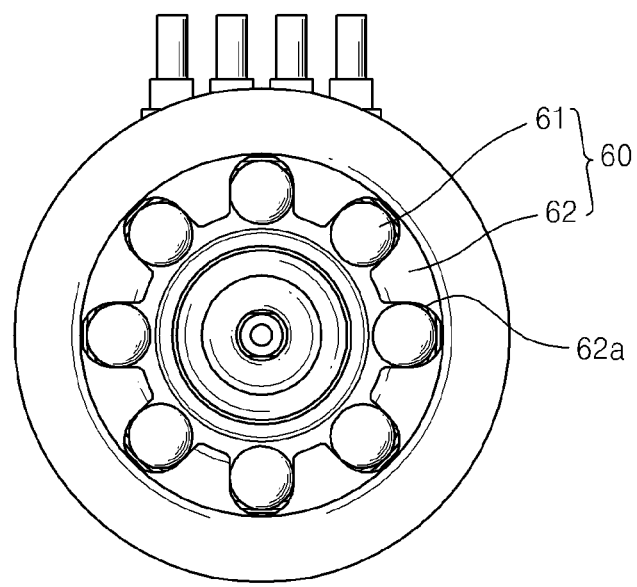
FIG. 9 is a partial cross-sectional view taken along a line IX-IX of FIG. 7.

FIG. 7 is a perspective view illustrating some elements of the apparatus of FIG. 1. FIG. 8 is a partial cross-sectional view taken along a line VIII-VIII of FIG. 7. FIG. 9 is a partial cross-sectional view taken along a line IX-IX of FIG. 7.

The transmission unit 80 can be rotatably disposed outside the second deceleration plate 62 and can transmit an external rotational force input by a user's manipulation to the second deceleration unit 60. Referring to FIG. 4, the transmission unit 80 can be rotatably installed on an outer container 7 of the case 5 by a central shaft 85. Once the transmission unit 80 and the central shaft 85 are inserted into the outer container 7 of the case 5, a rear cover 86 can be coupled to the case 5 to fix the transmission unit 80 and the central shaft 85.

Referring to FIG. 1, a rotatable ring 91 that is rotatable relative to the transmission unit 80 can be disposed outside the transmission unit 80. A driving gear 91a can be disposed on an inner circumferential surface of the rotatable ring 91. A first transmission gear 81 that can engage with the driving gear 91a can be disposed on a side of the transmission unit 80.

A driven gear 63 can be disposed on an outer surface of the second deceleration plate 62. A second transmission gear 82 engaged with the driven gear 63 can be disposed on another side of the transmission unit 80.

If the user rotates the rotatable ring 91 illustrated in FIGS. 1 and 2, a rotational force can be transmitted to the first transmission gear 81 of the transmission unit 80 to rotate the transmission unit 80 because the first transmission gear 81 is engaged with the driving gear 91a of the rotatable ring 91. As the transmission unit 80 rotates, the second transmission gear 82 can be rotated, which can rotate the second deceleration plate 62 because the second transmission gear 82 is engaged with the driven gear 63 of the second deceleration plate 62. Thus, an external rotational force can be transmitted through the first transmission gear 81 and the second transmission gear 82 to the second deceleration plate 62 of the second deceleration unit 60.

As shown in FIG. 9, grooves 62a into which the second deceleration balls 61 can be rotatably inserted can be formed in the second deceleration plate 62. Hence, when the second deceleration plate 62 rotates, a rotational force of the second deceleration plate 62 may be transmitted through the second deceleration balls 61 to the intermediate plate 50.

Once the driving unit 10 operates, the rotating plate 20 can rotate, and a rotational force of the rotating plate 20 can be transmitted to the first deceleration unit 30. As shown in FIG. 8, since the first deceleration balls 31 can be rotatably inserted into the ball support portion 35 of the first deceleration plate 32, the first deceleration plate 32 may be rotated due to a rotational force of the driving unit 10 transmitted through the rotating plate 20 to the first deceleration balls 31.

The user of the apparatus constructed as described above may finely or continuously adjust the position of the optical element 3 by rotating the rotatable ring 91 to rotate the rotating shaft 40 clockwise or counterclockwise without manipulating a specific switch. A mode in which the user adjusts the position of the optical element 3 by rotating the rotatable ring 91 can be referred to as a manual adjustment mode.

Also, in a state where the user does not rotate the rotatable ring 91, the position of the optical element 3 may be adjusted by applying a control signal to the driving unit 10. A mode in which the position of the optical element 3 is adjusted by using the driving unit 10 can be referred to as an automatic adjustment mode.

An operation of the apparatus constructed as described above is explained below with reference to FIG. 2.

In the automatic adjustment mode, a control signal can be applied to the driving unit 10, the output shaft 12 can then rotate due to the driving unit 10, and the rotating plate 20 coupled to the output shaft 12 can also rotate. A rotational force of the rotating plate 20 can be transmitted to the first deceleration balls 31 in frictional contact with the rotating plate 20.

A rotational force can also be transmitted through the first deceleration balls 31 to the intermediate plate 50 in frictional contact with the first deceleration balls 31 at a side facing away from the rotating plate 20. However, the intermediate plate 50 can contact the second deceleration balls 61, and the intermediate plate 50 can be maintained in a stopped state due to a frictional force between the intermediate plate 50 and the second deceleration balls 61, when the second deceleration balls 61 are being maintained in a stopped state.

The driven gear 63 formed on the outer surface of the second deceleration plate 62 can be engaged with the second transmission gear 82 of the transmission unit 80, and the first transmission gear 81 of the transmission unit 80 can be engaged with the driving gear 91a of the rotatable ring 91. A driving force generated by the driving unit 10 can be transmitted through the rotating plate 20, the first deceleration unit 30, and the intermediate plate 50 to the transmission unit 80; however, if the driving force transmitted from the driving unit 10 is set to be less than a force necessary for rotating the transmission unit 80, the transmission unit 80 may not rotate.

In order to rotate the transmission unit 80, a force large enough for the first transmission gear 81 of the transmission unit 80 to rotate the driving gear 91*a* of the rotatable ring 91 should be transmitted to the transmission unit 80. Since the transmission unit 80 increases a rotational force of the rotatable ring 91 and transmits the increased rotational force, the first transmission gear 81 can be larger than the second transmission gear 82. Since a magnitude of a driving force generated by the driving unit 10 and transmitted through the rotating plate 20, the first deceleration unit 30, and the intermediate plate 50 to the second deceleration unit 60 can be smaller than a force necessary for the transmission unit 80 to rotate the rotatable ring 91, the transmission unit 80, the second deceleration unit 60, and the intermediate plate 50 may be maintained in a stopped state without rotating.

When the intermediate plate 50 is being maintained in a stopped state and a driving force of the driving unit 10 is being transmitted to the rotating plate 20 and the first deceleration unit 30, the first deceleration balls 31 can roll along the intermediate plate 50. If a rotational speed of the rotating plate 20 is V, the first deceleration plate 32 can rotate at a speed of V/2, that is, ½ of the rotational speed of the rotating plate 20, and the rotating shaft 40 can also rotate at a speed of V/2.

Since the rotating shaft 40 rotates when the driving unit 10 operates as described above, the position of the optical element 3 may be automatically adjusted. Even though supply of a control signal applied to the driving unit 10 is stopped after the position of the optical element 3 is adjusted, the driving unit 10 may rotate due to an external force.

When a control signal is not supplied to the driving unit 10, a manual adjustment mode in which the user manually finely adjusts the position of the optical element 3 by rotating the rotatable ring 91 may be implemented. Once the rotatable ring 91 rotates due to the user's manipulation, a rotational force of the rotatable ring 91 can be transmitted through the driving gear 9*a* to the first transmission gear 81 of the transmission unit 80 to rotate the second transmission gear 82 of the transmission unit 80. Accordingly, the second transmission gear 82 of the transmission unit 80 can rotate, and a rotational force can be transmitted to the driven gear 63 engaged with the second transmission gear 82.

The second deceleration plate 62 can rotate due to a rotational force transmitted through the driven gear 63. The pressure plate 71 applying pressure on the second deceleration balls 61 toward the intermediate plate 50 can be coupled to the cover 6 and can be maintained in a stopped state. Accordingly, since the second deceleration balls 61 roll along a surface of the pressure plate 71 when the second deceleration plate 62 rotates, the intermediate plate 50 frictionally contacting the second deceleration balls 61 may rotate at twice a rotational speed of the second deceleration plate 62. That is, if a rotational speed of the second deceleration plate 62 is R, the intermediate plate 50 may rotate at a speed of 2R.

Since a control signal is not inputted to the driving unit 10, the rotating plate 20 connected to the driving unit 10 and the first deceleration unit 30 in frictional contact with the rotating plate 20 may freely rotate. Hence, once the intermediate plate 50 rotates, a rotational force can be sequentially transmitted to the first deceleration unit 30 frictionally contacting the intermediate plate 50 and the rotating plate 20 contacting the first deceleration unit 30. Accordingly, the rotating shaft 40 connected to the rotating plate 20 can rotate, and thus the position of the optical element 3 may be adjusted.

If the user continuously rotates the rotatable ring 91 while the manual adjustment mode is being implemented, the moving unit 2 can reach one of the end portions of the rotating shaft 40, and thus the rotating shaft 40 may no longer rotate. Installation of additional power interrupt equipment, such as a clutch, may be considered in order to not transmit a rotational force that may be transmitted when the user rotates the rotatable ring 91 in this state to the driving unit 10 or the like. However, such additional power interrupt equipment does not need to be installed in the afore-described embodiment.

If the user continuously rotates the rotatable ring 91 when the moving unit 2 reaches one of the end portions of the rotating shaft 40 and thus the rotating shaft 40 can no longer rotate, a rotational force can be transmitted through the transmission unit 80 to the second deceleration unit 60 and the intermediate plate 50. However, the first deceleration plate 32 of the first deceleration unit 30 can be maintained in a stopped state, and thus the first deceleration balls 31 can rotate on respective axes thereof. Thus, the rotational force transmitted by the user continuously rotating the rotatable ring 91 may not be transmitted to the rotating plate 20.

As described above, according to an apparatus for transferring an optical element according to embodiments, a driving force of a driving unit can be lowered and transmitted to a rotating shaft with a first deceleration unit, and an external rotational force can be transmitted to the rotating shaft with a second deceleration unit. Accordingly, a position of the optical element may be automatically adjusted by using the driving unit. Also, the position of the optical element may be manually finely adjusted according to a user's need without manipulating an additional switch.

Also, since mechanical elements, such as the first deceleration unit and the second deceleration unit, can be used without using additional mechanical elements, such as cam cylinders having cam guide grooves in order to rotate the rotating shaft by using a rotational force according to the user's manual manipulation or by using power of the driving unit, the apparatus may be designed to have a simple and compact structure.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, magnetic tapes, floppy disks, and optical data storage devices. The computer readable recording media may also be distributed over network coupled computer systems so that the computer readable code is stored and executed in a distributed fashion. This media can be read by the computer, stored in the memory, and executed by the processor.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. The words "mechanism" and "element" are used broadly and are not limited to mechanical or physical embodiments, but may include software routines in conjunction with processors, etc.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". It will be recognized that the terms "comprising," "including," and "having," as used herein, are specifically intended to be read as open-ended terms of art.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention.

What is claimed is:

1. An apparatus that transfers an optical element, the apparatus comprising:
    a driving unit that generates a driving force in response to an external signal;
    an output shaft that rotates by the driving force of the driving unit;
    a rotating plate that is connected to the output shaft and rotates with the output shaft;
    a first deceleration unit that comprises first deceleration balls that contact the rotating plate, and a first deceleration plate that rotatably supports the first deceleration balls and is disposed to be rotatable with respect to the rotating plate;
    a rotating shaft that has an outer screw surface and that rotates with the first deceleration unit by being coupled to the first deceleration unit;
    an intermediate plate that is disposed to be rotatable with respect to the first deceleration plate and frictionally contacts the first deceleration balls;
    a second deceleration unit that comprises second deceleration balls that contact the intermediate plate, and a second deceleration plate that rotatably supports the second deceleration balls and that is disposed to be rotational with respect to the intermediate plate;
    a transmission unit that transmits an external rotational force to the second deceleration unit; and
    a moving unit that supports the optical element and that is engaged with the outer screw surface of the rotating shaft and moves with the rotating shaft as the rotating shaft rotates;
    wherein, in order for the intermediate plate to be maintained in a stopped state while the rotating plate rotates due to the driving unit, a driving force of the driving unit transmitted through the first deceleration unit to the intermediate plate is set to be smaller than a force necessary for rotating the transmission unit; and
    wherein, when the driving unit does not generate the driving force, the rotating shaft is in a state where the rotating shaft is rotatable due to the external force, and when the external rotational force is transmitted through the transmission unit to the second deceleration unit, the intermediate plate, the first deceleration unit, and the rotating plate rotate together due to the second deceleration unit.

2. The apparatus of claim 1, wherein the rotating plate comprises a rotation central shaft that protrudes toward the first deceleration plate, and wherein the first deceleration plate is rotatably coupled to the rotation central shaft and the first deceleration balls are coupled to the first deceleration plate to be spaced apart from one another around the rotation central shaft.

3. The apparatus of claim 1, further comprising support balls that are disposed at positions inward of the first deceleration balls between the first deceleration plate and the rotating plate and that rotatably support the first deceleration plate with respect to the rotating plate.

4. The apparatus of claim 1, further comprising:
    a pressure plate that is disposed to frictionally contact the second deceleration balls;
    an elastic pressure portion that has a first end applying pressure on the pressure plate; and
    a cover that supports a second end of the elastic pressure portion.

5. The apparatus of claim 1, further comprising a rotatable ring that is rotatable relative to the transmission unit and comprises a driving gear,
    wherein a driven gear is disposed on an outer surface of the second deceleration plate, and
    wherein the transmission unit comprises a first transmission gear engaged with the driving gear and a second transmission gear engaged with the driven gear and rotatably disposed outside the second deceleration plate.

* * * * *